Jan. 26, 1960  W. G. MUSHRUSH  2,922,264
METHOD OF LAPPING
Filed Feb. 1. 1955  3 Sheets-Sheet 1

INVENTOR.
WILSON GEORGE MUSHRUSH
BY
William D. Carothers
HIS ATTORNEY

Jan. 26, 1960    W. G. MUSHRUSH    2,922,264
METHOD OF LAPPING

Filed Feb. 1, 1955    3 Sheets-Sheet 2

INVENTOR.
WILSON GEORGE MUSHRUSH
BY William D. Carothers
HIS ATTORNEY

INVENTOR.
WILSON GEORGE MUSHRUSH
HIS ATTORNEY

United States Patent Office 2,922,264
Patented Jan. 26, 1960

2,922,264
METHOD OF LAPPING

Wilson George Mushrush, Homer City, Pa., assignor to Syntron Company, Homer City, Pa., a corporation of Delaware Application February 1, 1955, Serial No. 485,494

7 Claims. (Cl. 51—281)

This invention relates generally to the art of abrading and more particularly to the method and apparatus for lapping or polishing objects.

The principal object of this invention is the provision of a method and apparatus for polishing or lapping end surfaces on articles. The motion creating the abrading-lapping action is a vibratory reciprocatory motor-driven movement of a lapping plate in an inclined arcuate path effective to convey the parts to be lapped over and in contact with the abrading surface of the plate. The movement of the abrading surface contacting the parts to be lapped is provided by any motor adapted to produce such motion. Preferably, as illustrated in this application, an electromagnetic motor, such, for example, as that illustrated and described in Weyandt Patent No. 2,658,609 is used.

The frequency and amplitude of reciprocal arcuate movements caused by such a motor is governed by the frequency of the alternating current and the power input energizing the motor. Ordinarily the frequency of such currents, as almost universally available for normal power purposes, is 60 cycles per second. However, the effective reciprocating movement of the plate produced by such current may, by suitable control, produce a driving reciprocatory motion at a frequency one half, the same as, or double that of the alternating current frequency, or at a slightly less or greater frequency than that of the current, by use of controls known to the vibratory motor art. This produces a rapidly reciprocating vibratory movement of a circular lapping plate driven by the the motor in forward and back and up and down directions, the reciprocating movement of any point on the circular plate differs in amplitude and path of arcuate movement from any other point on the circular driven plate according to distance of the respective points from the axis of the driven plate. The amplitude can be adjusted to work requirements by means well known in the vibratory motor art.

With specific reference to the circular or arcuate lapping or polishing motion, it has been discovered that this action coupled with a relatively small diameter flat abrading surface, produces a novel action in lapping an article when the dimension of which is less than half of the dimension of the diameter of the flat abrading surface. When such a surface is vibrated in an inclined arcuate path of motion about its central axis, the center of the surface has a materially less arcuate movement than that of the perimeter. Since the article has a width the whole area of which is simultaneously acted upon by the vibrating surface, one-half of the article is being vibrated through a smaller arc than the other half. In fact, the arcuate movement varies in magnitude from zero at the center of the vibrating surface to a maximum at its periphery. Thus the article will rotate about its own axis as it moves forward and this rotation will always be toward the center or the smaller arc of vibration. This movement of the lapping surface with which the article being lapped is in contact produces a rotary motion of the article about its own axis and simultaneous movement of the article around the axis of the plate. If the body is as large as the vibrated surface, it will of course rotate about its own axis which would be the same axis as that of the vibrating surface.

By the continuous rotating and simultaneous revolving movement of articles on the lapping surface by the method and apparatus here disclosed the abrading action is applied to the face being lapped in constantly changing directions. This results in a smooth lapped surface without scratches or unequal reduction of the surface, as may result from grinding or manual polishing.

Another advantage and object of this invention is the ability of lapping opposite surfaces simultaneously. The articles being polished or lapped may be positioned on the vibrating surface and a weight having a similar surface supported on top of the articles. This weight having a similar grinding surface will polish or lap the top of the articles as this inclined arcuate vibratory path of vibration must be transmitted through the articles onto the weight, which being substantially as large as the vibratory disc will merely rotate but not as fast as the articles thereunder and in contact therewith.

In the apparatus illustrated and described for practicing the method herein claimed, a circular plate having in effect an abrasive surface and a peripheral bounding flange or wall for retaining parts being lapped, and retaining lapping slurry, is driven by the vibratory motor. This in effect forms a circular bowl provided with a bottom plate provided with a lapping surface. The walls will retain the lapping material whether it be liquid, powder suspended in a liquid, or merely a powder. This material may be combined with cloth or paper abrasive secured to the vibrating plate and weight. Such surfaces may also be covered with non-abrasive cloths or coverings such as cork, felt, or flannel employed with or without rouge. Each of these features provide a novel improvement in the art.

The lapping plate forming the bottom of the bowl by which articles having a plane surface are to be lapped, will be flat. If the surface is dished or spherical, then a similar surface is lapped on the articles.

Another object is the provision of vibratory lapping with varied pressure against the article and the abrading surface. This variable lapping pressure controls the fineness of the lapped surface.

Another advantages of a circular electromagnetic lapping machine of this character is that it can be allowed to continue with little or no attention without fear of spoiling the tool, machine, or article.

Other objects and advantages appear hereinafter in the following description and claims.

The accompanying drawings show for the purpose of exemplification without limiting the invention or claims thereto certain practical embodiments illustrating the principles of this invention wherein:

Figure 1:
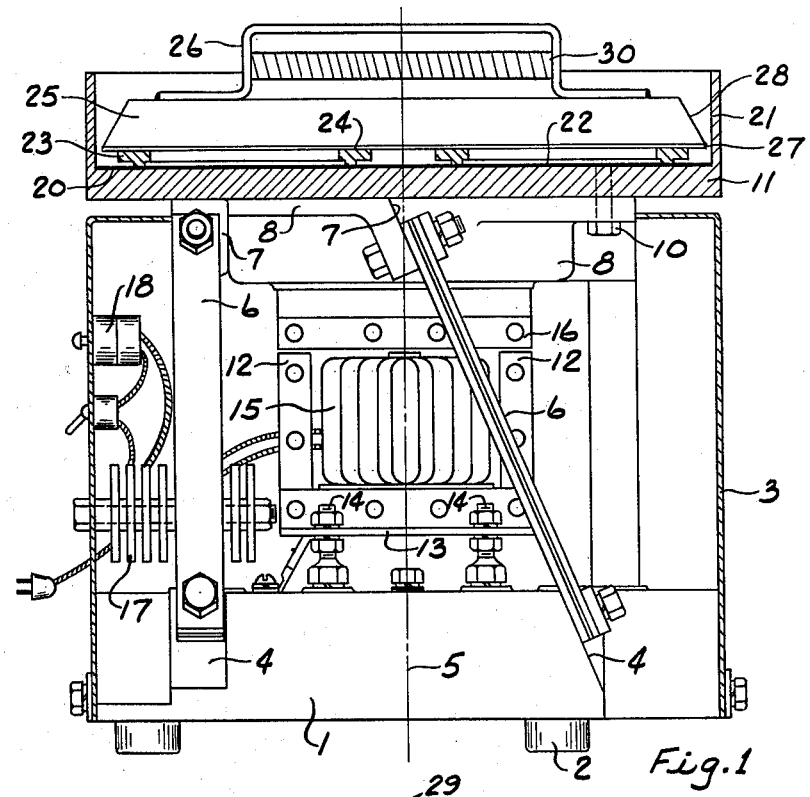
Fig. 1 is a view in vertical section of the lapping machine.

Referring to the drawings, the motor employed to illustrate the principles of this lapping and polishing machine is that of an electromagnetic motor which comprises the base 1 preferably a massive structure supported by resilient feet 2 and carries an outer casing 3 which encloses the motor.

The base 1 is provided with a plurality of sloping seats 4 symmetrically disposed about a vertical central axis indicated by a construction line 5. As shown the seats 4 support the lower ends of the tuned cantilever springs 6 of which there are four sets symmetrically disposed with one on each side of the base. The upper ends of these leaf springs are secured to the corresponding seats 7 formed on the frame structure 8. This frame member is provided with openings to receive the mounting bolts 10 for securing the polishing plate 11 to the frame.

The motor illustrated is of the electromagnetic type and comprises a core member 12 which is E-shaped and which is adjustably mounted on the bracket 13 on the top of the base 1 by means of the mounting bolts 14. The center post of the core 12 is provided with an electromagnetic coil 15 and its electrical connections extend to the operating controls. By properly mounting the core 12 on the base, its pole faces will be symmetrically mounted relative to the armature 16 which in turn is secured to the under side of the frame 8. The armature 16 is centrally mounted relative to the axis 5 and the springs which support the frame also position the armature 16 relative to the pole faces of the core 12 so as to provide a proper air gap between the armature 16 and each of the pole faces of the E-shaped core. By energizing the electromagnetic coil 15 with current impulses, the electromagnetic energy impulses of the core draw the armature down causing the springs 6 to flex and move the frame in a helical or an inclined arcuate path of movement. When the energy impulse passes, the springs return to their normal position permitting the frame to rise again to its normal position. The springs travel slightly beyond the stationary position, thus providing a complete oscillatory movement in an inclined arcuate path. The movements of the lapping plate above described in this paragraph are all relative to a fixed vertical axis normal to the circular flat lapping surface.

By tuning the springs 6 to reciprocate the frame at a frequency of a few cycles more or less than the frequency of the driving energy impulses, the vibratory system would follow in synchronism with the frequency of the energy impulses and the best operation of this reciprocating vibratory device will be obtained. Such vibratory motors produce a rapid reciprocatory movement of the lapping base upon which the articles being treated rest.

If the armature is made of permanent magnet material the frame will reciprocate in synchronism with the energy impulses such as any suitable source of alternating current since one impulse would attract the armature and the next impulse would repel the armature. If the armature is made of laminated steel, the field would be reciprocated at the rate equal to twice the frequency of the alternating current, as each cycle has two current impulses.

A half-wave rectifier such as shown at 17 can be employed to reduce the number of alternating current impulses to that of the frequency of the current. The armature and the parts attached thereto are attracted by each alternate current impulse to reciprocate at the frequency of the alternating current.

The magnitude of the current impulses is controlled by a simple rheostat as shown at 18. The coil 15, the half-wave rectifier 17 and the rheostat 18 are all connected in series across the source of alternating current.

As illustrated in the drawings the polishing plate 11 is in the form of a bowl having a uniform flat bottom 20 and an annular retaining flange or wall 21. The grinding surface is provided with a grinding cloth or similar material such as illustrated at 22. The articles being ground are the rings 23 which have their small bearing surface facing on the cloth 22 and their larger bearing surfaces in engagement with the cork surface 24 of the pressure plate 25. Both the cloth surface 22 and the cork surface 24 are cemented or otherwise secured to the grinding surface 20 of the bowl 11 and to the under surface of the pressure plate 25 respectively. The pressure plate 25 is also provided with a handle 26 to lift the same out of the bowl. It will be noted that the pressure plate has considerable body to provide it with sufficient weight needed for lapping pressure on the article between the cork 24 and the cloth grinding surface 22.

Figure 2:
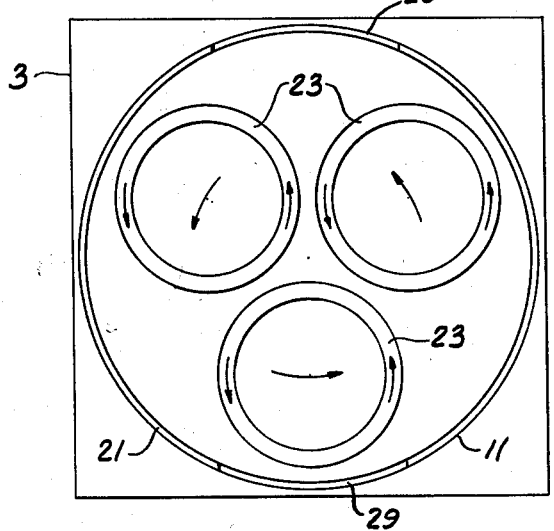
Fig. 2 is a top plan view with the pressure plate removed.

The bowl 11 and its lapping plate bottom as shown in Fig. 2 is circular and the articles 23 rotate on their respective axes and in counter-clockwise direction as the articles themselves revolve around the axis of the bowl within the bounding peripheral flange. The pressure plate 25 is likewise round and has a small clearance as indicated at 27 between its lower edge and the wall 21 of the bowl 11. However, the sides of the pressure plate 25 are beveled as indicated at 28 so as to minimize friction between the plate and the walls 21. When liquid abrasives are used the plate reduces splashing. The rapidity of the lapping action is dependent to some extent on the pressure between the abrasive surface and the face being treated. Usually the articles are weighted to increase the speed of lapping action. For articles having substantial intrinsic weight, as for example, steel parts and the like, the weight of the articles themselves may be sufficient to secure desired lapping results. The time required will vary to some extent in inverse proportion to the pressure per unit of surface contact of the articles on the lapping member.

The abrasive cloth 22 may be an emery cloth, a carborundum cloth or a crocus cloth. However, loose abrasive powders of these materials and Gamma Alumina, Linde B, which is sapphire dust, or cerium oxide may be employed. When employing a powder like Gamma Alumina, it is usually provided in a water solution. In place of the abrasive cloth 22 one may employ a pad such as a Buehler brand microcloth or red felt. Buehler brand red felt is ordinarily employed with Gamma Alumina. It may be also used with a Linde B abrasive. Microcloth is a cotton fabric disc filled with rayon fibers.

If opposite sides of the article are to be lapped the abrasive cloth 22 is on the bowl bottom and the abrasive cloth 24 is mounted on the pressure plate with the article therebetween and thus both sides are lapped simultaneously. The article may be turned upside down to insure a smooth and uniform lapping surface. In order to insure non-rotary movement of the pressure plate when it is desired to lap the upper surface a bar such as indicated at 30 is extended through the handle 26 and engages the upwardly open notches 29 in the bowl rim which prevents the pressure plate from rotating. However, the pressure plate will retain its full pressure on the lapped articles as they are being lapped. Other lubricants commonly used with the powders are turpentine, water, kerosene, lard and machine oil. Kerosene is generally employed with the cloth, and water for abrasive powder. If the articles being lapped are heavy they need no pressure plate as their own weight will be sufficient.

Figure 3:
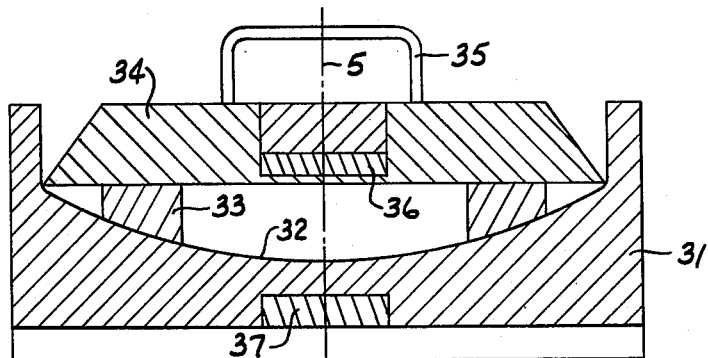
Fig. 3 is a view in section of a dished pan with a smooth spherical grit supporting surface and a flat cloth covered pressure plate.

As illustrated in Fig. 3, the bowl 31 is provided with a spherical bottom surface 32 for the purpose of lapping the bottom of the ring 33. The pressure plate 34 is similar to the pressure plate 25 and it is provided with a handle 35 but it is also provided with a central magnet 36 which co-acts with the magnet 37 in the bottom of the bowl for the purpose of increasing the pressure and retaining the pressure plate in its center position or approximately so. A slight movement of the pressure plate laterally is permitted and will not produce inaccuracy as the surface is substantially spherical. However, the pressure plate 34 cannot be too far removed from the central axis as it will be retained by the attraction between magnets 36 and 37. Again the magnets provide a downward pressure which increases the pressure due to the weight of the pressure plate 34. When these are electromagnetically operated the magnetic pressure can be varied.

Figure 4:
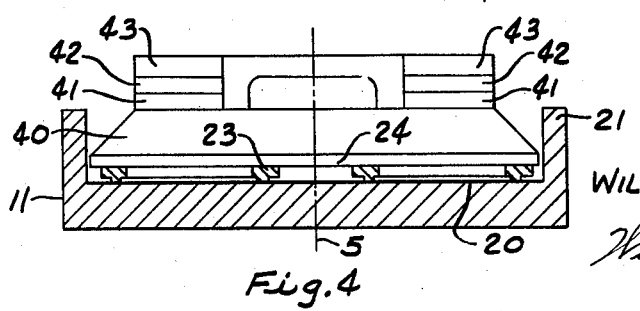
Fig. 4 is a view in section of the pan secured thereto and a pressure plate having a cork surface.

As shown in Fig. 4 the bottom of the bowl 11 has a grinding surface 20 which is merely a cast iron grinding surface and the pressure plate 40 is provided with a series of weights 41, 42, and 43. Thus by adding or subtracting these weights on the pressure plate, one may add or subtract the pressure on the grinding surface between the articles 23 and the grinding surface 20. A cork surface 24 is placed on the under side of the pressure plate 40.

Figure 5:
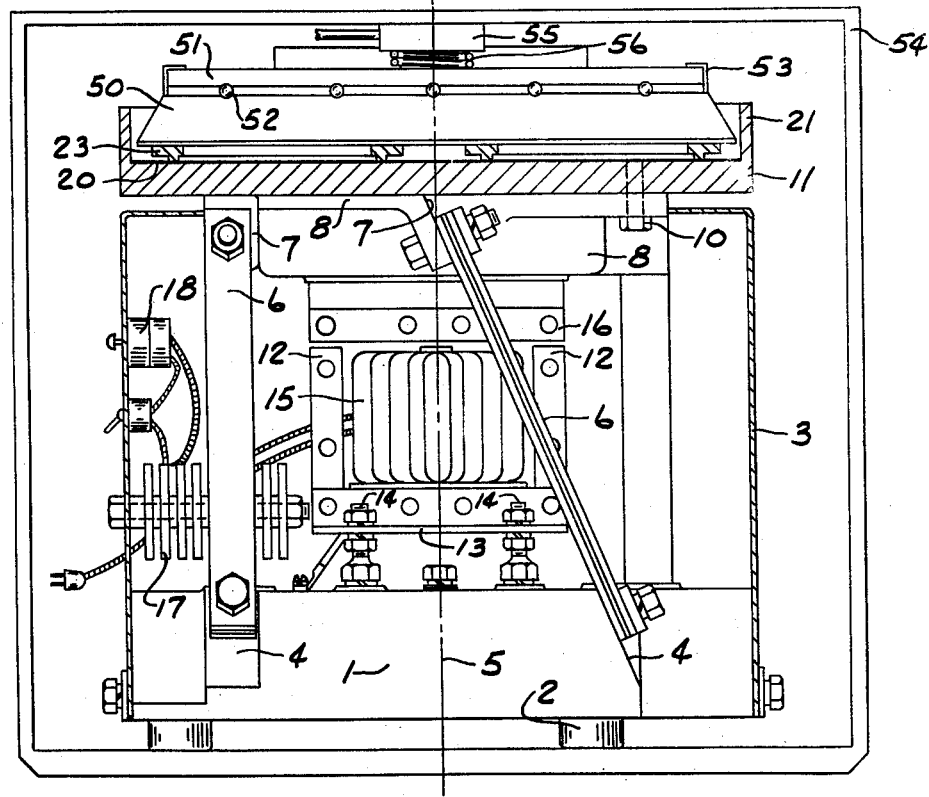
Fig. 5 is a view in section showing the lapping machine having a fluid pressure plate capable of varying the pressure of the article on the lapping surface.

As shown in Fig. 5 the grinding bowl 11 is provided with a grinding surface 20 and the pressure plate 50 has mounted thereon a second plate 51 which is supported thereon by an annular antifrictional bearing structure 52. A fence or guard 53 encloses the plate 51 and protects the bearing structure which rides in the race common to both the plates 50 and 51. Between the plate 51 and the bridge member 54 is a fluid pressure device 55 which when supplied with fluid under pressure expands or contracts and thus adds more or less additional pressure on the pressure weight 52. This in turn is effective on the parts 23. However, in addition to the pressure device 55 one can employ a spring 56 which is loaded by the device 55. Thus the spring, not being capable of following the vibratory movement of the electromagnetic motor, permits the pressure plate 50 to rotate. However, the pressure plate 51 and the fluid actuating device 55 and the springs 56 remain stationary being connected with the bridge 54. In this manner one can vary the lapping pressure during the operation of the device.

Figure 6:
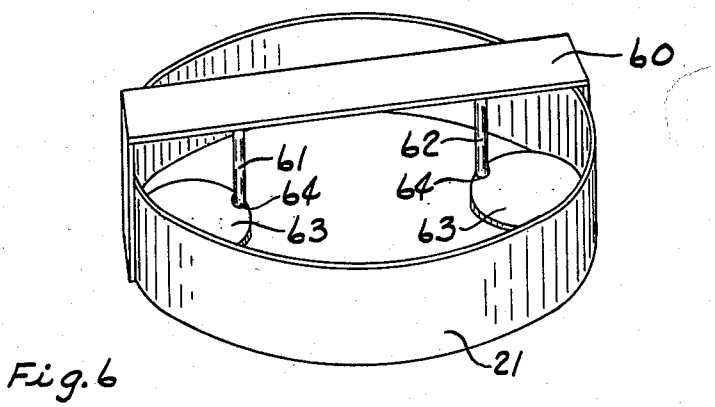
Fig. 6 is a perspective view of a turning guide and bridge on the lapping bowl.
Figure 7:
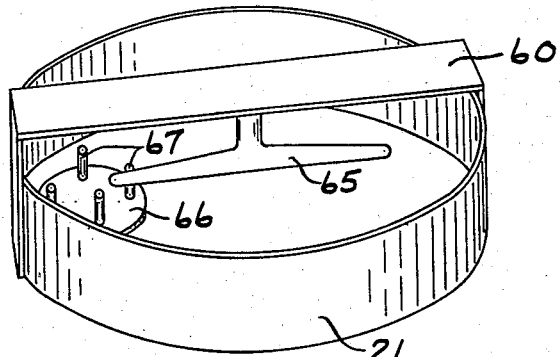
Fig. 7 is a modified turning guide on the lapping bowl.

When lapping optical flats, or other articles which require it, and speedier and more proficient lapping action is desired, a turning guide and bridge such as shown in Figs. 6 and 7 may be employed. As shown in Fig. 6 a bridge 60 is extended over the top of the bowl 21 and is equipped with depending figures 61 and 62 which frictionally engage the pressure plate 63 at a point 64, and by friction resulting the upper surface of the pressure plate is given an added twist as it revolves around the bowl. The pressure plate 63 revolves to a point beyond which the fingers no longer contact the friction point thereby releasing the pressure plate for travel in the bowl to the second finger 62 where the same operation is repeated.

In Fig. 7 the bridge 60 on the bowl 21 has the guide 65. The pressure plate 66 is equipped with a series of fingers 67 which engage the guide thereby obtaining an added twist and speed to the normal rotation of the pressure plate and thereby increase the lapping action.

I claim:

1. The method of lapping the face of an article which comprises placing the article on a rotary plate having an abrasive surface, leaving the article free to move on the abrasive surface, rapidly reciprocating the plate to move its periphery in a rotary inclined arcuate path about the vertical rotary axis of the plate, thereby causing the article to rotate about its own axis on the abrasive surface.

2. The method of lapping opposite faces of an article which comprises placing the article between oppositely positioned abrasive surfaces of an upper lapping plate and a lower rotary lapping plate, leaving the article free to move between the abrasive surfaces, rapidly reciprocating the lower lapping plate to move its periphery in a rotary inclined arcuate path of movement about the vertical rotary axis of the lower plate, to produce rotary movement of the article about its own axis, and to produce abrading action between the rotating article and the abrasive surfaces.

3. The method of lapping the faces of articles which comprises placing the articles on a circular rotary lapping plate having an abrasive surface greater in radius than the longest dimension of the articles, the placing of the articles on the rotary lapping plate to be eccentric to the vertical axis of the plate, leaving the articles free to move on the abrasive surface, retaining the articles on the abrasive surface, rapidly reciprocating the lapping plate to move its periphery in an inclined arcuate path of movement about the vertical rotary axis of the plate, to produce continuous rotation of the articles about their own axes and simultaneous revolution about the axis of the rotary lapping plate, to produce relative movement with abrading contact between the abrasive surface and the faces to be lapped, whereby constantly changing the direction of relative contacting movement of the abrasive surface and the faces of the articles to be lapped.

4. The method of lapping the face of an article to finish that face, comprising placing the article on a rotary lapping plate having an abrasive surface and placing the article eccentrically to the vertical rotary axis of the plate, retaining the article on the abrasive surface, leaving the article free to move on the abrasive surface, rapidly reciprocating the plate to move its periphery continuously forward and back and up and down along an inclined arcuate path of movement about the vertical rotary axis of the plate which progressively decreases in forward and back motion to zero at the vertical rotary axis, causing the article resting on the abrasive surface to revolve around the axis of the lapping plate and simultaneously to rotate about its own axis, thereby lapping the face of the article with constantly changing direction of relative movement between the abrasive surface and the contacting face of the article being lapped.

5. The method of lapping a face of an article, comprising placing the article on the abrasive surface of a rotary lapping plate having a vertical rotary axis and placing the article eccentrically to the vertical rotary axis of the plate, retaining the article on the abrasive surface, leaving the article free to move on the abrasive surface, rapidly reciprocating the rotary plate in an inclined arcuate path about the vertical rotary axis to cause the article to rotate on its own axis and simultaneously to revolve about the vertical rotary axis of the plate, to produce relative movement in constantly changing direction between the abrasive surface of the plate and the article positioned thereon.

6. The method of lapping a face of an article, comprising placing the article on the abrasive surface of a lapping plate having a fixed axis and placing the article eccentrically to the fixed axis, retaining the article on the abrasive surface, the plate having a greater radius than the longest dimension of the article, leaving the article free to move on the abrasive surface of the lapping plate, the plate being continuously positioned in normal relation to its fixed axis, continuously reciprocating the plate forward and back and up and down along an inclined arcuate path about its fixed axis, said forward and back movement of the plate progressively decreasing in amplitude to zero at its fixed axis, to revlove the article aroung the axis of the plate and to simultaneously rotate the article about its own axis, to produce relative movement in constantly changing direction between the contacting face of the plate and the face of the article movably positioned thereon.

7. The method of lapping a face of an article, comprising placing the article with the face to be lapped on the abrasive face of a rotary plate and placing the article eccentrically to the rotary axis of the plate, leaving the article free to move on the abrasive face, rapidly reciprocating the plate with inclined peripheral vibratory arcuately reciprocatory movements about the rotary axis, to rotate the article about its axis on the abrasive face, and to revolve the article about the rotary axis of the plate, thereby constantly changing the direction of relative surface contacting movements of the abrasive face and the article.

References Cited in the file of this patent

UNITED STATES PATENTS

| | | |
|---|---|---|
| 2,063,687 | Le Frand | Dec. 8, 1936 |
| 2,161,115 | Walstrom | June 6, 1939 |
| 2,185,922 | Meitner | Jan. 2, 1940 |
| 2,291,268 | Wigglesworth | July 28, 1942 |
| 2,402,689 | Snow et al. | June 25, 1946 |
| 2,464,216 | Devol | Mar. 15, 1949 |
| 2,554,701 | Hachett et al. | May 29, 1951 |
| 2,585,637 | Dremel | Feb. 12, 1952 |
| 2,614,369 | Robins | Oct. 21, 1952 |
| 2,658,609 | Weyandt | Nov. 10, 1953 |
| 2,700,259 | Dreyfus | Jan. 25, 1955 |